US006833021B1

(12) United States Patent
Hourn et al.

(10) Patent No.: US 6,833,021 B1
(45) Date of Patent: Dec. 21, 2004

(54) METHOD FOR TREATING PRECIOUS METAL BEARING MINERALS

(76) Inventors: Michael Matthew Hourn, 14 Kinrade Place, Carindale (AU); Rodrigo Ulep Ventura, 30 Heldale Street, Sunnybank Hills (AU); John Anthony Willis, 56 Chancellor Street, Sherwood (AU); David Winborne, 65 Elbury Street, Mitchelton (AU)

(*) Notice: Subject to any disclaimer, the term of this patent is extended or adjusted under 35 U.S.C. 154(b) by 0 days.

(21) Appl. No.: 09/831,355
(22) PCT Filed: Sep. 20, 1999
(86) PCT No.: PCT/AU99/00796
§ 371 (c)(1),
(2), (4) Date: May 14, 2001
(87) PCT Pub. No.: WO01/17407
PCT Pub. Date: Mar. 30, 2000

(30) Foreign Application Priority Data

Sep. 21, 1998 (AU) .............................................. PP6025
Oct. 6, 1998 (AU) .............................................. PP6313

(51) Int. Cl.$^7$ ................................................ C22B 3/12
(52) U.S. Cl. .............................. 75/744; 423/22; 423/27; 423/28; 423/29
(58) Field of Search ................................ 75/744; 423/22, 423/27, 28, 29

(56) References Cited

U.S. PATENT DOCUMENTS

| 4,654,079 | A | | 3/1987 | Nunez |
| 4,738,718 | A | * | 4/1988 | Bakshani et al. ............. 423/29 |
| 5,007,589 | A | | 4/1991 | Evans |
| 5,536,480 | A | * | 7/1996 | Simmons ..................... 423/28 |
| 5,993,635 | A | * | 11/1999 | Hourn et al. ................ 205/584 |

FOREIGN PATENT DOCUMENTS

| AU | 73192/87 | 11/1988 |
| CN | 1228480 | 9/1996 |
| EP | 0 177 292 | 4/1986 |
| WO | 9629430 | 9/1996 |

OTHER PUBLICATIONS

Derwent Abstract Accession No. 93–345542/44, CN, A, 1067271 (XI'AN College Metallurgical Building), Dec. 23, 1992.
Derwent Abstract Accession No. 93–345541/44 CN, A, 1067270 (XI'AN College Metallurgical Building), Dec. 23, 1992.

* cited by examiner

*Primary Examiner*—Melvyn Andrews
(74) *Attorney, Agent, or Firm*—Hoffman, Wasson & Gitler

(57) ABSTRACT

A method of processing a mineral composition comprising a refractory material the method comprising milling the composition to a particle size of $P_{80}$ of less than 25 microns and leaching said composition with a solution comprising lime and/or limestone in the presence of an oxygen containing gas.

16 Claims, 2 Drawing Sheets

METHOD FOR TREATING PRECIOUS METAL BEARING MINERALS

FIELD OF THE INVENTION

The present invention relates to a process for leaching refractory sulphide and/or carbonaceous ores or concentrates and in particular is directed towards a method of recovering precious metals contained in the ores or concentrates.

BACKGROUND ART

Gold is generally extracted from gold containing ores by treatment with a cyanide solution which solubilizes the gold. However, in some ores, the gold is present as microparticles encapsulated within the ore. The gold in such ores cannot be extracted by traditional cyanidation techniques. These types of ores are known as refractory ores and are typically sulphide and/or carbonaceous ores. These ores may also contain, along with sulphides, other compounds of other Group VIA elements such as Selenium and Tellurium.

In order to extract gold from refractory sulfide ores, the ores must first be treated to liberate the gold so as to be accessible to cyanide leaching. A refractory ore is typically treated by oxidizing the ore which results in the chemical destruction of the refractory component of the ore, liberating precious metals for subsequent recovery. Known methods of oxidising refractory ores include roasting, bacterially assisted leaching and leaching the ore at elevated temperatures and pressure under acidic conditions.

An example of such a process for treating sulphide ores is known as the Sherritt process which includes the steps of feed preparation, pressure oxidation in the presence of acid and oxygen, solid/liquid separation, liquid neutralization and gold recovery from the oxidised solids by cyanidation. The operating conditions required in this process are at temperatures of between about 150° C. to 210° C., a total pressure of 2,100 kPa, a pulp density of 20% to 30% solids by mass, acid concentration of 20–100 g/L and a retention time of two to three hours. The oxidation must be carried out in an autoclave and requires a source of oxygen.

The capital costs associated with providing the autoclaves and meeting a high oxygen demand are high and may be prohibitive for construction at remote sites, for medium to small scale operations and for low grade ore. It is possible to leach under less aggressive conditions but in this case, the leaching rates and recovery are too low to be economically viable.

Attempts have been made to reduce the aggressive conditions and to lower the pressures and temperatures required whilst maintaining the economic viability of refractory ore treatment processes. For example, Australian patent application no. 27182/92 describes subjecting an ore concentrate to fine grinding prior to leaching. Fine grinding to an 80% passing size of 15 micron or less enabled the leaching to be carried out under less aggressive conditions at temperatures of 95–110° C. and pressures of about 1000 kPa.

Thus, whilst some progress has been made in reducing the operating parameters when using oxygen as the oxidant, the leach must still be carried out under pressure.

U.S. Pat. No. 5,536,480 also describes subjecting an ore to fine grinding prior to acid pressure leaching. In this case, the refractory sulfide ore contains carbonaceous material and the ore is ground to a particle size of 40 microns or less. It was found that in order to obtain an acceptable gold recovery it was necessary to oxidize the material at a minimum temperature of 200° C. and to obtain a minimum sulfur oxidation of 96%.

It is also known to oxidatively leach mineral species with ferric ions under acidic conditions. Ferric ion is typically a more effective oxidizing agent than oxygen which means that oxidation with ferric ions can be carried out under less aggressive conditions. Oxidative leaching at atmospheric pressure using ferric ions is known. A disadvantage of leaching with ferric ions is that the ferric ions are reduced to ferrous ions during the leaching reaction. As leaching solutions are recycled, therefore, ferric ions must be regenerated by oxidizing the reduced ferrous ions.

A further disadvantage with the aforementioned leaching processes for precious metal recovery is that they operate under acidic conditions. One difficulty with leaching under acidic conditions is that ores which contain an organic carbon fraction, known as carbonaceous ores cannot readily be processed to obtain acceptable levels of precious metal recovery. Precious metals such as gold are typically recovered from a leach solution by a cyanide leach stage. The reduction in recovery is due to absorption of the precious metals by the organics, during the cyanide stage. The absorbed metals cannot be recovered by cyanidation without a further pre-treatment stage designed to destroy the carbonaceous matter.

In order to address the problem of organic carbon, carbonaceous refractory ores are commonly treated by roasting to convert carbonaceous matter in the ores to gaseous carbon dioxide, or by treatment with a strong chemical oxidant, such as chlorine, to oxidize the carbonaceous matter. Both methods are expensive and are not economically viable for treatment of low grade materials.

Still further, as leaching steps such as cyanidation require alkaline conditions, the acid must be removed prior to cyanidation.

The problem of removing acid prior to cyanidation may be overcome by leaching under alkaline conditions. Leaching of nickel and cobalt under alkaline conditions using ammonia/ammonium salts is well known. However, a major disadvantage of alkaline leaching is that when iron containing ores such as pyrite are oxidised, the iron which is leached precipitates as a passive iron oxide layer on the mineral particle. This layer inhibits further oxidation with the result being that the extent of leaching under alkaline conditions is less than under acidic conditions. This translates to a lower recovery of precious metals.

Still further, alkaline leaching of refractory materials requires elevated pressure and temperatures and an oxidant for the leaching to occur. However, even under aggressive alkaline conditions, recovery of precious metals is often less than that for acid leaching. Further, base metals such as copper and zinc are insoluble at high pH. Thus, alkaline leaching is unsuitable for leaching ores or concentrates where recovery of base metals from base metal sulphides such as chalcocite, sphalerite or chalcopyrite is required. For these reasons, commercial and academic interest has been directed towards acid leaching.

Most of the literature relating to alkaline leaching is directed towards the use of water soluble alkalis such as sodium or potassium hydroxide and ammonia. A disadvantage with these reagents is that iron is precipitated primarily as jarosite. Jarosite inhibits gold recovery and is also an environmentally unacceptable residue. Also, hydroxide reagents and in particular sodium hydroxide are prohibitively expensive.

The use of cheaper alkalis such as lime has been proposed. However, to date, leaching of iron sulphide materials with lime has been unsuccessful in that leaching is incomplete and subsequent precious metal recovery is low. For example, an earlier study of alkaline oxidation of pyrite for gold recovery using lime achieved only 30 to 40% gold recovery which offered little improvement over direct cyanidation of the pyrite. This is believed to be due to passivation of the mineral by precipitation of a gypsum/iron oxide layer.

Limestone is another alkali which is relatively cheap. Limestone is typically used in the neutralization of acidic leachates. However, limestone is considered to be insufficiently reactive and/or soluble in alkaline systems to be able to be used for alkaline leaching.

From an economic point of view, it would be desirable to be able to leach refractory materials for precious metal recovery under mild alkaline conditions and using reagents other than the expensive hydroxides.

As mentioned above, it is known that the oxidation rate under acidic conditions can be increased by fine grinding to increase the surface area of the mineral particles. Such an increase may be predicted given that there is a larger surface area exposed to the oxidizing agents. However in the alkaline system, this effect is substantially reduced in view of the formation of the passive iron oxide layer on the particles. The rate determining factors in the alkaline systems are believed to relate to the formation of the passivating iron oxide layer and diffusion of oxygen through the layer. Thus, workers in the field have concentrated on increasing the extent of alkaline leaching by using strong, soluble alkalis, by modifying the leaching conditions so as to minimise formation of the passive layer and/or influence the diffusion rate through the layer.

One study suggests leaching at higher temperatures or at relatively concentrated solutions of reagents. The reason for this is to rapidly produce a passive layer which is unstable and subject to cracking. It is believed that at lower temperatures, the layers grow more slowly and are more stable. Another suggestion has been to use additives which may react to dissolve the layer or to make the layer more permeable.

However, to date no method has been proposed which is able to economically leach iron containing refractory ores and concentrates under alkaline conditions and which also enables good recovery of precious metals from the ore or concentrates.

The present invention is based on the surprising and unexpected discovery that leaching refractory sulfide and/or carbonaceous materials under alkaline conditions can be successfully achieved by careful selection of the particle size of the material to be leached. Even more surprising it has been discovered that not only can the leaching efficiency be improved but that leaching can also be successfully conducted under relatively mild conditions. Still further, it has also been discovered that the activity of any carbonaceous matter in the feed material can also be substantially reduced as part of the oxidation process, to a point where it will not compete with the activated carbon added to commercial gold/silver recovery processes, where cyanide is used to leach the precious metals.

According to a first broad form of the invention there is provided a method of processing a mineral composition comprising a refractory material the method comprising milling the composition to a particle size of $P_{80}$ of less than 25 microns and leaching said composition with a solution comprising lime and/or limestone in the presence of an oxygen containing gas.

In the present specification and claims the term "refractory material" includes refractory sulfides such as pyrite in which precious metals are encapsulated, ores which contain carbonaceous material and telluride or selenide materials. In the present specification and claims, the use of the term "ore" Includes not only ore per se but also includes concentrates, slimes, tailings, spoil and waste materials which may have a recoverable amount of precious metal values. Carbonaceous material refers to materials having an organic carbon fraction which may include graphite, bituminous or partly bituminous material.

The method of the present invention is particularly applicable to a composition including an iron containing refractory sulphide, selenide or telluride material or a mixture of such materials, with or without carbonaceous material present. Examples of such materials include pyrite, marcasite, arsenopyrite and arsenic bearing pyrite, troilite and pyrrhotite.

According to a further broad form of the invention there is provided a method of processing a mineral composition comprising an iron containing refractory material the method comprising milling the composition to a particle size of $P_{80}$ of less than 25 microns and leaching said composition with a solution comprising lime and/or limestone in the presence of an oxygen containing gas.

Other non-iron or minor iron containing materials may also be present in the composition, examples of which include stibnite, tetrahedrite, argentopyrite, calaverite, altaite, gold bearing selenides, tennantite and pentlandite. The method of the present invention is also applicable to a composition including carbonaceous matter, where the carbonaceous matter would otherwise interfere with the precious metals recovery process. Suitably the composition would not include economic amounts of base metal sulphides containing copper or zinc. Generally a composition which includes appreciable amounts of these base metals would not be treated directly by the method of the present invention. The reason for this is purely economical as copper and zinc precipitate under alkaline conditions and thus cannot be recovered easily. Under acidic leaching conditions, copper and zinc are solubilized and can be recovered by conventional SX/EW techniques. Use of flotation or other separation technologies to produce a base metal concentrate and a separate refractory iron sulphide concentrate would be obvious to one skilled in the art as a way of treating these materials.

The method of the present invention is in particular directed towards the treatment of refractory materials containing precious metals such as gold, silver and platinum. Suitably, the refractory materials are in the form of flotation concentrates although the method is suitable for ores if the economics are favourable.

In the method of the present invention, the composition is finely ground to a particle size of 80% by mass passing less than 25 $\mu$m. A typical particle size range is between 80% passing 2–25 $\mu$m and preferably between about 80% passing 5–15 $\mu$m.

A preferred apparatus for producing the finely ground material is a stirred ball mill. However, it will be appreciated that several other suitable types of comminution apparatus may also be used.

The leaching is carried out using lime and/or limestone as the alkali reagent. Lime, limestone or a mixture thereof may be used. Preferably a mixture in the range of 40–95% limestone is used. The lime and/or limestone is added in an amount such that the pH of the system is between about 6–12 and preferably about 6–9.

Typically about 100 to about 1200 kg, of lime and/or limestone is added per tonne of solids. The amount of lime and/or limestone which will need to added to maintain a desired pH will generally vary according to the amount (if any) of sulphuric acid produced by sulphide oxidation. Generally about 800 kg of lime and/or limestone would be added.

The present inventors have also surprisingly discovered that not only can the overall amount of leaching be increased but that such an increase can also be obtained by leaching under milder conditions than has hitherto been possible. Suitably the method of the present invention can be carried out at ambient pressure. This avoids the use of expensive pressure reactors and autoclave equipment. The preferred operating temperature is between about 50° C. up to the boiling point of the mixture. Typically the maximum temperature is about 95° C.

The leaching reaction can thus be carried out in open tank reactors. Excess heat is removed by evaporation of the solution. This avoids the need for costly heat exchangers. Heat can be easily introduced by known methods such as the injection of steam.

The leaching reaction is carried out in the presence of an oxygen containing gas. When the reaction is carried out in an open tank reactor the gas is typically introduced by sparging. The gas may be oxygen, air or oxygen enriched air. The gas flow is dependent upon the amount of oxygen required to sustain the leaching reaction and is typically about 0.01–0.5 vvm (vessel volumes per minute). The oxygen consumption of the process is typically between about 200–1000 kg of oxygen per tonne of solids.

After the composition has been leached, the mixture can be further treated by known methods to recover precious metals, principally by cyanide leaching.

Cyanidation occurs under alkaline conditions. As the leach solution is already alkaline, the solution may be subjected directly to cyanide leaching. If desired the slurry may be thickened prior to cyanide leaching. A further advantage of the current invention is that the type of compounds that form in the alkaline leaching system are not reactive toward cyanide, and will not consume high levels of cyanide in the gold recovery stage. Compounds formed under acidic leach conditions often consume significant amounts of cyanide in the gold recovery stage, increasing the process costs.

According to a further broad form of the invention there is provided a method of recovering precious metals from a mineral composition comprising a refractory material, the method comprising;

grinding the material to a particle size of 80% passing 25 μm or less;

leaching the ground material in the presence of lime and/or limestone and an oxygen containing gas; and subjecting the leached material to a further leaching step to recover any precious metals.

BEST MODE

Figure 1:
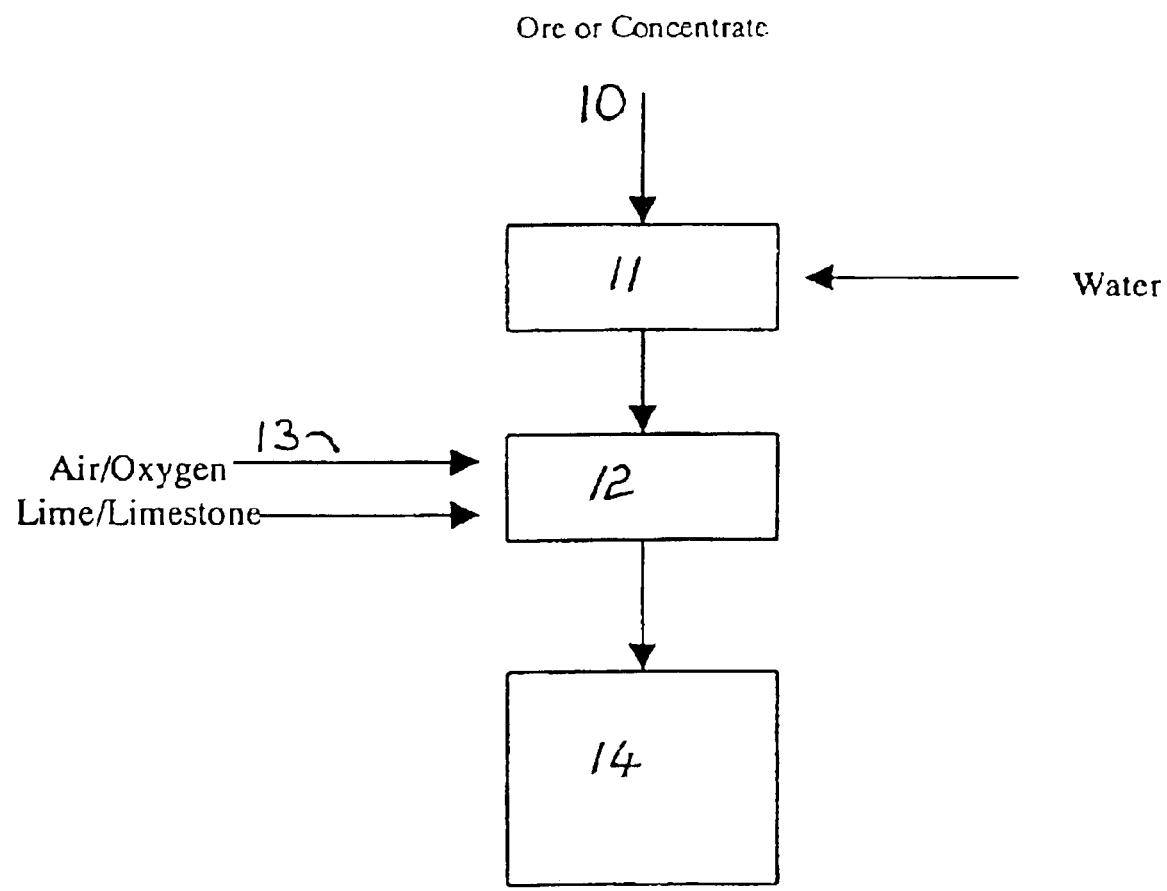
FIG. 1 is a flow diagram of a preferred method of the present invention.

Referring now to FIG. 1, the ore or concentrate 10 is slurried to about 50% solids and fed into a stirred ball mill 11 and milled to a particle size of 80% passing 25 μm or less. The milled material is then fed into a non-pressurized reactor 12. Oxygen or air 14 is introduced into the reactor 12 and leaching is carried out at atmospheric pressure at a temperature of between about 50 to about 95° C. Lime and/or limestone 13 are added to the reactor 12 to control the pH to between about 6 and about 12. The leached material is then subjected to metals recovery 14.

Figure 2:
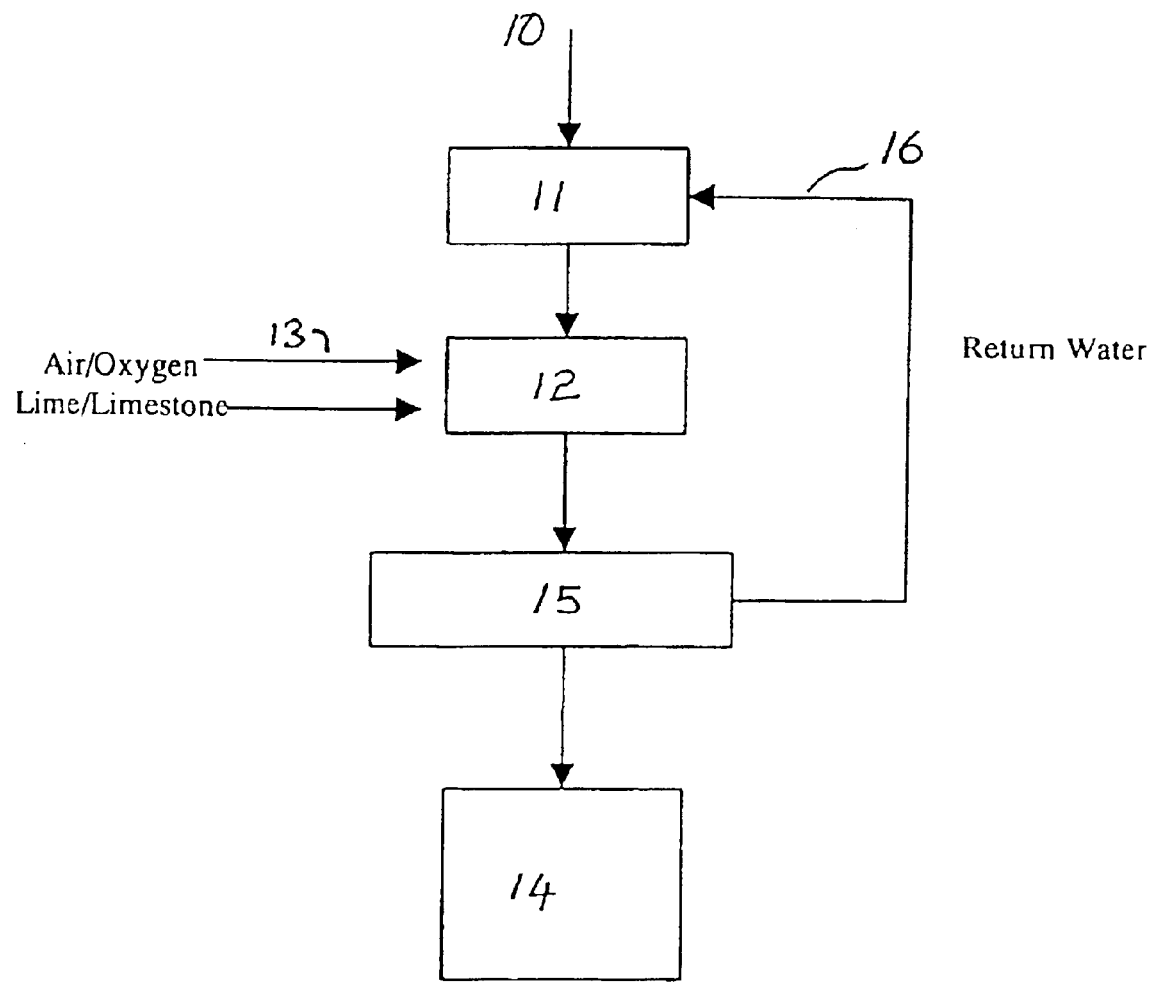
FIG. 2 is a flow diagram of a further preferred method of the present invention.

FIG. 2 illustrates a further flow diagram. This diagram is similar to that of FIG. 1 and the same reference numerals have been used to identify the same steps or reagents. The process illustrated in this diagram further includes a thickener 15 which thickens the slurry following the leaching stage in reactor 12 prior to metals recovery 14. The excess solution 16 is returned to the mill 11 for reuse.

The present invention will now be described in relation to the following examples.

EXAMPLE No. 1

Leach of a Pyrite Containing Ore, with a 50:50 Blend of Limestone and Lime, Oxygen Used as the Oxidant Alkali Leach The ore sample was slurried in tap water at 50% solids and milled in a laboratory rod mill for a period of 20 minutes to achieve a slurry ground to 80% passing 106 microns. The slurry was then thickened to 60% solids, and milled in a Netzsch horizontally stirred laboratory scale bead mill. The media used was 0.8–1.1 mm steel balls. Slurry was passed through the mill sequentially to achieve the required grind size of 80% passing 14 microns. The final particle size distribution was determined by lasersizer.

The leaching test was carried out in a cylindrical stainless steel reactor fitted with four baffles located equidistant around the edges of the vessel. A 1,000 gram sample of the ground solids were added to the leach vessel along with 20 liters of tap water. The slurry was agitated by a 6 bladed Rushton style impeller. Oxygen was introduced to the reactor by an air spear, which terminated below the impeller. The oxygen flow was controlled by a rotameter at 2,000 cubic centimeters per minute (0.1 vvm).

The pH in the vessel was maintained by an automated pH analyser and controller, to a set point of 10. A combination glass pH probe was immersed in the slurry through a port in the lid of the reaction vessel. A limestone/lime slurry was continuously circulated from a stirred beaker through a ring main using a peristaltic pump. The limestone/lime slurry consisted of 50% lime and 50% limestone, at a slurry density of 35% w/w solids. A solenoid valve was attached to the ring main, with an outlet line directed to the reaction vessel. The controller actuated the solenoid when the pH in the vessel drifted below the set point.

The vessel was heated by steam injection into a jacket surrounding the vessel. The steam injection was regulated by a solenoid valve, which was controlled by an automatic temperature controller. The vessel temperature was controlled to 85° C. The outside of the vessel was wrapped in insulated foam to prevent heat loss.

On completion of the test, the slurry was filtered and the filter cake dried and weighed. A sample of the filter cake was analysed for residual sulphide by acid evolution. A further sample of the cake was sent for XRD analysis to confirm the sulphide analysis. The dry weight of the filter cake was 1150 grams. The results of the sulphide oxidation step are listed below in Table 1.

TABLE 1

Degree of sulphide Oxidation Achieved for Whole Ore Leach

| Sample | Weight - grams | % sulphide sulphur | % Pyrite by sulphide evolution | % Pyrite by XRD | % sulphide oxidation |
|---|---|---|---|---|---|
| Feed | 1000 | 8.2 | 15.2 | 15.8 | 90.1 |
| Leach Residue | 1150 | 0.7 | 1.30 | 1.6 | |

EXAMPLE No. 2

Comparative Leaching of a Pyrite Containing Concentrate, with a 80:20 Blend of Limestone and Lime and Acid, Oxygen Used as the Oxidant Alkali Leach The concentrate sample was milled according to the procedure outlined in example 1, to achieve the required grind size of 80% passing 9.6 microns.

The leaching test was carried out in a 10 liter cylindrical stainless steel reactor fitted with four baffles located equidistant around the edges of the vessel. A 2000 gram sample of the ground solids was added to the leach vessel along with 10 L of tap water.

The slurry was agitated by a 6 bladed Rushton style impeller. Oxygen was introduced to the reactor by an air spear, which terminated below the impeller. The oxygen flow was controlled by a rotameter at 800 cubic centimeters per minute (0.08 vvm).

A single addition of 2100 grams of limestone and 380 grams of hydrated lime was made to the vessel at the start of the test.

The vessel was placed on a thermocouple controlled hotplate, with the thermocouple immersed in the slurry through a stainless steel sheath. The vessel was maintained at the required temperature by the thermocouple controller. The temperature was controlled to 82° C.

On completion of the test, the slurry was filtered and the filter cake dried and weighed. A sample of the filter cake was analysed for residual sulphide. The dry weight of the filter cake was 4230 grams.

Acid Leach

The concentrate sample was milled according to the procedure outlined in Example 1, to produce a final product at 80% passing 9.6 microns. The leaching test was carried out in a 10 liter cylindrical stainless steel reactor fitted with four baffles located equidistant around the edges of the vessel. A 1400 gram sample of the ground solids was added to the leach vessel along with 10 L of tap water. The slurry was agitated by a 6 bladed Rushton style impeller. Oxygen was introduced to the reactor by an air spear, which terminated below the impeller. The oxygen flow was controlled by a rotameter at 800 cubic centimeters per minute (0.08 vvm).

A single addition of 100 grams of sulphuric acid and 250 grams of ferric sulphate hexahydrate was made to the vessel at the start of the test. The vessel temperature was controlled to 82° C. On completion of the test, the slurry was filtered and the filter cake dried and weighed. A sample of the filter cake was analysed for residual sulphide. The dry weight of the filter cake was 1812 grams.

The results of the sulphide oxidation steps are listed below in Table 2.

TABLE 2

Degree of Sulphide Oxidation Achieved for Pyrite Concentrate

| Sample | Weight - grams | % sulphide sulphur | % sulphide oxidation |
|---|---|---|---|
| Alkaline Leach | | | |
| Feed | 2000 | 42 | 88.5 |
| Leach Residue | 4230 | 2.3 | |
| Acid Leach | | | |
| Feed | 1400 | 42 | 74.7 |
| Leach Residue | 1812 | 8.2 | |

Cyanide Leach

A sample of each leach residue and the un-oxidised feed material were slurried in tap water at a slurry density of 40% w/w solids in a baffled glass reactor. The volume of the reactor was 3 liters. The slurry was agitated by a 6 bladed Rushton downdraft style impeller. Air was introduced to the reactor by the action of the downdraft impeller.

The pH of the slurry was adjusted and maintained at pH 10 using lime, and sodium cyanide was added to the slurry to maintain a free cyanide level of 500 ppm. The test was carried out for a period of 24 hours. On completion of the test, the slurry was filtered and the filter cake washed with deionised water.

The filtrate and washings were combined for analysis. The solid filter cake was dried in an oven and analysed to determine the precious metals recovery. The results of the cyanide leach are listed in Table 3.

TABLE 3

Cyanide Leach Results for Oxidised Pyrite Concentrate

| Sample | % pyrite oxidised | Gold Extraction % | Sodium Cyanide consumed - kg/tonne |
|---|---|---|---|
| Feed prior to oxidation | NA | 26.6 | 4.5 |
| Acid Oxidized Residue | 74.7 | 72 | 11.7 |
| Alkaline Oxidised Residue | 88.5 | 94 | 3.6 |

The precious metals extractions were determined by head and tails fire assay.

EXAMPLE No. 3

Leach of a Pyrite Containing Concentrate, with a 80:20 Blend of Limestone and Lime, Air Used asthe Oxidant Alkali Leach The concentrate sample was milled according to the procedure outlined in example 1, to achieve the required grind size of 80% passing 12 microns. The final particle size distribution was determined by lasersizer.

The leaching test was carried out in a cylindrical stainless steel reactor fitted with four baffles located equidistant around the edges of the vessel. A 200 gram sample of the ground solids were added to the leach vessel along with 2,000 mL of tap water. The live volume of the reactor was 2.5 liters.

The vessel was fitted with a stainless steel lid to prevent evaporative loss from the reactor. The slurry was agitated by a 6 bladed Rushton style impeller. Air was introduced to the reactor by an air spear, which terminated below the impeller. The air flow was controlled by a rotameter at 200 cubic centimeters per minute (0.1 vvm).

The pH in the vessel was maintained using the same system described in Example 1, with the exception that the limestone/lime slurry consisted of 20% lime and 80% limestone, at a slurry density of 35% w/w solids.

The vessel was placed on a thermocouple controlled hotplate, with the thermocouple immersed in the slurry through a stainless steel sheath. The vessel was maintained at 85° C. by the thermocouple controller.

On completion of the test, the slurry was filtered and the filter cake dried and weighed. A sample of the filter cake was analysed for residual sulphide by acid evolution. The dry weight of the filter cake was 469 grams. The results of the sulphide oxidation step are listed below in Table 4.

TABLE 4

Degree of Sulphide Oxidation Achieved for Pyrite Concentrate when oxidised with Air as the Oxidant

| Sample | Weight - grams | % sulphide sulphur | % Pyrite by acid evolution | % sulphide oxidation |
|---|---|---|---|---|
| Feed | 200 | 33.2 | 61.73 | 90.1 |
| Leach Residue | 469 | 1.4 | 2.6 | |

EXAMPLE No. 4

Leach of an Arsenopyrite Containing Concentrate, with a 50:50 Blend of Limestone and Lime, Oxygen Used as the Oxidant Alkali Leach An arsenopyrite concentrate, grading 10.73% arsenic and 32% sulphur was tested for gold recovery. The concentrate sample was milled according to the procedure outlined in example 1, to achieve the required grind size of 80% passing 14 microns. The final particle size distribution was determined by lasersizer.

The leaching test was carried out according to the procedure outlined in Example 1. A 1500 gram sample of the ground solids were added to the leach vessel. The pH in the vessel was maintained according to the method outlined in Example 1.

On completion of the test, the slurry was filtered and the filter cake dried and weighed. A sample of the filter cake was analysed for residual sulphide by acid evolution. A further sample of the cake was sent for XRD analysis to confirm the sulphide analysis. The dry weight of the filter cake was 2965 grams. The results of the sulphide oxidation step are listed below in Table 5.

TABLE 5

Degree of Sulphide Oxidation Achieved for Arsenopyrite Concentrate

| Sample | Weight grams | % sulphide sulphur | % Arsenopyrite by XRD | % Pyrite by XRD | % sulphide oxidation |
|---|---|---|---|---|---|
| Feed | 1500 | 20.1 | 30.6 | 29.5 | 93.1 |
| Leach Residue | 2965 | 0.7 | <1 | 1.4 | |

The presence of arsenic as ferric arsenate in the leach residue was confirmed by XRD Cyanide Leach The cyanide leach procedure was the same as outlined for Example 2. The results of the cyanide leach are listed in Table 6.

TABLE 6

Cyanide Leach Results for Oxidised Pyrite and Arsenopyrite Concentrate

| Sample | % pyrite oxidised | % arsenopyrite oxidised | Gold Extraction % |
|---|---|---|---|
| Feed | NA | NA | 35.8 |
| Oxidised Residue | 90.6 | >95 | 88.05 |

The precious metals extractions were determined by head and tails fire assay.

EXAMPLE No. 5

The Effects of Varying Alkali Mixtures on the Extent of Sulphide Oxidation

Alkali Leach

Approximately 5 kg of pyrite concentrate was milled according to the procedure outlined in example 1, to achieve the required grind size of 80% passing 8.6 microns. The final particle size distribution was determined by lasersizer. On completion of the grind, the ground slurry was split into 500 gram subsamples for the leaching test, and each subsample filtered separately. All subsamples were stored frozen to prevent oxidation of the pyrite.

A 200 gram sample was split out of each subsample for the leaching testwork. The leaching test was carried out according to the procedure outlined in Example 3. A 200 gram sample of the ground solids was used for the test. The pH in the vessel was maintained using the same system described in Example 1.

The limestone/lime slurry composition was varied for the three leach tests according to the following ratios: 100% lime, 50% lime 50% limestone, 10% lime 90% limestone. The vessel temperature was controlled to 85° C. On completion of the test, the slurry was filtered and the filter cake dried and weighed. A sample of the cake was sent for XRD analysis to determine the extent of pyrite leaching. The dry weight of the filter cake was recorded.

The results are listed in Table 7, below

TABLE 7

The Effects Of Varying Lime/Limestone Blends On The Extent Of Pyrite Oxidation From Pyrite Flotation Concentrate Alkaline Leach Tests

| | | | |
|---|---|---|---|
| PH | 10 | 10 | 10 |
| Alkali mixture | 100% lime | 50% lime 50% limestone | 10% lime 90% limestone |
| Grind Size - 80% passing | 8.6 | 8.6 | 8.6 |
| % solids | 10.0 | 10.0 | 10.0 |
| Feed data: | | | |
| Dry solids wt g | 200 | 201.0 | 201.1 |
| % pyrite in head | 65.0 | 65.0 | 65.0 |
| Residue data: | | | |
| % pyrite in residue | 3.2 | 3.0 | 1.0 |
| % pyrite oxidised from XRD | 95.47 | 90.1 | 94.3 |

EXAMPLE No. 6

The Effects of Varying Grind Size on the Extent of Sulphide Oxidation

Alkali Leach

Approximately 4 kg of pyrite concentrate sample was milled according to the procedure outlined in example 1, to produce 6 individual samples at the required grind sizes of 80% passing:

| | |
|---|---|
| Pass1 | 51.9 microns |
| Pass2 | 32.04 microns |
| Pass3 | 17.94 microns |
| Pass4 | 13.64 microns |
| Pass5 | 11.71 microns |
| Pass6 | 8.6 microns |

On completion of the grind, the ground slurry was split into 500 gram subsamples for the leaching test, and each subsample filtered separately. All subsamples were stored frozen to prevent oxidation of the pyrite.

A 200 gram sample was split out of each subsample for the leaching testwork. The leaching tests were carried out according to the procedure outlined in Example 3. The pH in the vessel was maintained using the system described in Example 1. The vessel temperature was controlled to 80° C. On completion of the test, the slurry was filtered and the filter cake dried and weighed. A sample of the cake was sent for XRD analysis to determine the extent of pyrite leaching. The dry weight of the filter cake was recorded.

The results are listed in Table 8, below

TABLE 8

The Effects of Varying Grind Size on the Extent of Pyrite Oxidation from Pyrite Flotation Concentrate Alkaline Leach Tests

| pH | 10 | 10 | 10 | 10 | 10 | 10 |
|---|---|---|---|---|---|---|
| Alkali mixture | 100% lime | 100% lime | 100% lime | 100% lime | 100% lime | 100% lime |
| Grind Size - 80% passing | 51.9 | 32.04 | 17.94 | 13.64 | 11.71 | 8.6 |
| % solids | 10.0 | 10.0 | 10.0 | 10.0 | 10 | 10.0 |
| Feed data: | | | | | | |
| Dry solids wt g | 200.0 | 200 | 200 | 200 | 200 | 200 |
| % pyrite in head | 65.0 | 65.0 | 65.0 | 65.0 | 65.0 | 65.0 |
| Residue data: | | | | | | |
| % pyrite in residue | 16.7 | 9.7 | 7 | 2.7 | 3.7 | 3.2 |
| % pyrite oxidised from XRD | 73.9 | 80.1 | 91.06 | 96.81 | 95.54 | 95.47 |
| % additional gold recovery | 0 | 4 | 8 | 12 | 14 | 14 |

EXAMPLE No. 7

Leach of a Pyrite Containing Concentrate, with a 50:50 Blend of Limestone and Lime with Oxygen Used As the Oxidant, at Varying pH Alkali Leach The concentrate sample was milled according to the procedure outlined in example 1, to achieve the required grind size of 80% passing 12 microns. All leaching tests were carried out according to the procedure outlined in Example 2.

The pH in the vessel was maintained by an automated pH analyser and controller. In all, three tests were carried out, each at a different pH. The pH control points used were

| Test 1 | pH 8 |
|---|---|
| Test 2 | pH 9 |
| Test 3 | pH 10 |

The limestone/lime slurry consisted of 50% lime and 50% limestone, at a slurry density of 35% w/w solids. The vessel temperature was controlled to 85° C.

On completion of the test, each slurry was filtered and the filter cake dried and weighed.

TABLE 9

Degree of oxidation of Pyrite at Varying pH

| Control pH | Not oxidised | Oxidised at pH 8 | Oxidised at pH 9 | Oxidised at pH 10 |
|---|---|---|---|---|
| % sulphur oxidation | <10 | 90 | 94 | 94 |

Cyanide Leach

The cyanide leach procedure was the same as outlined for Example 2. The results of the cyanide leach are listed in Table 10.

TABLE 10

Gold Recoveries from Oxidised Pyrite concentrate at Varying pH

| Control pH | Not oxidised | Oxidised at pH 8 | Oxidised at pH 9 | Oxidised at pH 10 |
|---|---|---|---|---|
| Au recovery - % | 26.6 | 92.2 | 96.1 | 91.2 |

The precious metals extractions were determined by head and tails fire assay.

EXAMPLE No. 8

Leach of a Pyrite Concentrate Containing High Levels of Carbonaceous Matter

Alkali Leach

A 1200 gram sample of concentrate containing approximately 18% w/w pyrite and 21.8% w/w organic carbon was produced by flotation of a carbonaceous ore sample with diesel. The concentrate sample was milled according to the procedure outlined in Example 1, to achieve the required grind size of 80% passing 9 microns The leach test was carried out according to the procedure outlined in Example 3, using a 120 gram sample of the ground concentrate. A single addition of 40 grams of hydrated lime and 160 grams of limestone was made to the leach at the start of the leach test, and the slurry allowed to react for 24 hours. The vessel temperature was controlled to 85° C. On completion of the test, the slurry was filtered and the filter cake dried and weighed.

Gold Adsorption Tests

A 20 ppm gold in cyanide solution was made up in de-ionised water. The free cyanide level in the solution was 500 ppm.

A 20 gram sample of the oxidised concentrate was added to 500 mL of the gold cyanide solution, and the solution agitated by magnetic stirrer. The solution was sampled regularly over a period of 75 minutes. A 20 gram sample of the ground concentrate, which had not been subjected to oxidative leaching, was also added to 500 mL of gold cyanide solution, and the solution agitated by magnetic stirrer. The solution was also sampled regularly over a period of 70 minutes.

All solution samples were analysed for gold by DIBK extract/AAS. The results of the gold adsorption tests are listed below in Table 11

TABLE 11

Effect of Oxidative Alkaline Leaching on the Activity of Carbonaceous Mat rial.

| | Gold in Solution (ppm) | |
|---|---|---|
| Time (min) | Alkaline leach residue | Ground Concentrate |
| 0 | 17.4 | 15.9 |
| 1 | 15.2 | 11.4 |
| 5 | 15.2 | 10.2 |
| 10 | 14.9 | 9.65 |
| 20 | 14.8 | 9.20 |
| 50 | 14.6 | 9.10 |
| 70 | 15.4 | — |
| 75 | — | 9.20 |

EXAMPLE No. 9
Leach of Electrolytic Copper Refinery Slimes Containing Gold And Silver Selenides and Tellurides
Alkali Leach A 1500 gram sample of Electrolytic Copper Refinery Slimes, assaying 16.2% Cu, 8400 g/t Au, 7.8% Ag, 0.24% Te, 2.45% Se, was milled according to the procedure outlined in Example 1, to 80% passing 9 microns.

Copper Refinery Slimes contain gold and silver in the form of telluride and selenides. Typical constituents of the slimes include phases with the composition $(Cu,Ag)_2Se$ and $(Cu,Ag)_2Te$. These phases do not leach in conventional cyanide leach circuits.

The leach test was carried out according to the procedure outlined in Example 2. A 570 gram sample of the ground slimes was added to the leach vessel along with 8 L of tap water. A single addition of 380 grams of hydrated lime and 1520 grams of limestone was made to the leach at the start of the leach test, and the slurry allowed to react for 24 hours. The vessel temperature was controlled to 85° C. On completion of the test, the slurry was filtered and the filter cake dried and weighed.

Cyanide Leaching Tests

Two cyanide leaching tests were carried out. The cyanide leach procedure was the same as outlined for Example 2. The results of the cyanide leach are listed in Table 12.

TABLE 12

Gold Recoveries from Copper Refinery Slimes

| | Alkaline Leached slimes | Non Alkaline Leached Slimes |
|---|---|---|
| Gold Extraction | 92 | 46.5 |

Gold recovery from the alkaline leached slimes was significantly higher than for the fresh slimes, indicating that the gold bearing selenide and telluride phases present in the slimes were broken down in the alkaline leach.

EXAMPLE No. 10
Leach of a Stibnite $(Sb_2S_3)$ Concentrate
Alkali Leach

A 250 gram sample of concentrate containing 40% w/w $Sb_2S_3$ and 60% w/w siliceous gangue was slurried in tap water at 60% solids, and milled in an ECC vertically stirred laboratory mill. Slurry was milled to achieve the required grind size of 80% passing 12 microns. The final particle size distribution was determined by lasersizer.

The leach test was carried out according to the procedure outlined in Example 3. A 200 gram sample of the ground concentrate was used in the test.

A single addition of 30 grams of hydrated lime and 120 grams of limestone was made to the leach at the start of the leach test, and the slurry allowed to react for 24 hours. The vessel temperature was controlled to 85° C. On completion of the test, the slurry was filtered and the filter cake dried and weighed. The results of the oxidation test are listed in Table 12, below.

TABLE 12

Oxidation of finely ground Stibnite (Sb2S3) with lime/limestone under alkaline conditions.

| Sample | Weight | % sulphide | % sulphide oxidation |
|---|---|---|---|
| Feed concentrate | 200 | 9.43 | 87 |
| Oxidised Residue | 326.9 | 0.76 | |

It can be seen that by grinding to 25 μm or less and leaching under alkaline conditions with lime and/or limestone that 90% or more of the refractory components of the feed can be oxidised. A high level of oxidation typically translates to high precious metal recovery. However, for some ores or concentrates a high level of gold recovery can be achieved with comparatively low levels of sulfide oxidation. When processing such ores or concentrates according to the invention, typically only, as much sulfur as required would be oxidized to obtain a desired level of gold recovery.

The high degree of oxidation of the minerals which can be achieved as a result of the present invention sets it apart from other processes where air and lime are added to sulphide slurries prior to cyanide leaching. In these other processes, the addition of air to a level of bout 10–20 kg/tonne solids and lime, to a level of only 5–20 kg/tonne of solids, is designed to remove soluble ions from the solution phase of the slurry that may impact adversely on the cyanide leach stage. The current invention, on the other hand, substantially breaks down the solid phase of the slurry, liberating encapsulated gold for recovery through cyanide leaching, with much higher consumption of lime and or limestone.

The methods of the present invention offer a number of advantages over existing methods. First, iron containing refractory ores such as pyrite and arsenopyrite can be oxidised to high levels under alkaline conditions using lime and/or limestone as the alkali source. Selenides and Tellurides present in these feeds are broken down in the process and the activity of any carbonaceous matter in the feed is substantially reduced. Lime and limestone offer significant economic advantages over the known agents such as caustic. For example, current costs for caustic are about AUD$440 per tonne, ammonium based salts, about AUD$450, lime AUD$100–200 and limestone AUD$15–41/tonne.

Further, the leach need not be pressurized, which translates to significant capital and operating costs. Still further, costs can be reduced as the leach can be carried out using air instead of oxygen. This means that oxygen need not be purchased or produced. Further economic benefits can be realized as the cyanide consumption of residues leached by the present method is less than that for resides leached under acidic conditions.

The leach residence times for the preferred methods of the present invention are typically about 12–30 hours. These residence times compare favorably to oxidative leaching under acidic conditions and are in fact superior to atmospheric ferric leaching.

Further, leaching under the condition of the present invention inactivates any carbonaceous material which allows precious metals to be recovered by cyanide lixivation.

During the leaching iron precipitates as goethite and hematite, rather than Jarosite as occurs under acidic conditions. Jarosite inhibits subsequent precious metal recovery by making the residue difficult to settle and filter. Further, Jarosite is not an environmentally acceptable residue.

Gypsum is also formed during the leach and precipitates. An advantage of gypsum is that it enhances the filterability of the residue. Gypsum is not formed when using conventional alkali reagents.

Another advantage over the use of the water soluble alkali reagents is that in the present invention arsenic present in the refractory material is precipitated as ferric arsenate. The level of arsenic in the leach liquor is typically below detectable limits. When using conventional soluble alkalis arsenic is present in the leach liquor.

The process of the present invention has enabled recovery of precious metals from sulfide and/or carbonaceous ores under (1) conditions of temperature and pressure which were previously believed to be insufficiently reactive for such ore materials, (2) the use of alkaline reagents which were also previously believed to be insufficiently reactive and/or soluble and (3) under pH conditions which were previously believed to lead to passivation and incomplete oxidation of the ore particle.

In the present specification and claims, the term "comprise" and variations such as "comprises" and "comprising" or the term "include" or variations thereof will be understood to imply the inclusion of a stated element or integer or a group of integers or elements, but not the exclusion of any other element or integer or group of elements or integers.

What is claimed is:

1. A method of recovering precious metals from a mineral composition prior to separate cyanide leaching, the mineral composition comprising a refractory material, the method comprising milling the composition to a particle size of $P_{80}$ of less than 25 microns and leaching said composition at atmospheric pressure with a solution comprising lime and/or limestone in the presence of an oxygen containing gas, the leaching being initiated under alkaline conditions to form a leached material, and subjecting the leached material to a cyanide leaching step to recover precious metals.

2. The method of claim 1, wherein the refractory material is selected from the group comprising an iron containing sulfide ore, a refinery slime, a carbonaceous ore, a selenide and a telluride.

3. The method of claim 1, wherein the refractory material is selected from the group consisting of pyrite, marcasite, arsenopyrite, troilite, pyrrhotite stibnite, tetrahedrite, argentopyrite, calaverite, altaite, gold bearing selenides, tennantite and pentlandite.

4. The method of claim 3, wherein the refractory material is pyrite or arsenopyrite.

5. The method of claim 1, wherein the material is leached in an open tank reactor.

6. The method of claim 2, wherein the material is leached at a temperature of about 50° C. up to about the boiling point of the solution.

7. The method of claim 1, wherein the oxygen containing gas is oxygen and the oxygen is introduced into the leaching solution to a level of between about 200 to about 1000 kg/tonne of solids in the leaching solution.

8. The method of claim 7, wherein the oxygen is introduced into the leaching solution at a flow rate of between about 0.1 to about 0.5 vvm.

9. The method of claim 1, wherein the particle size is between about 2 to about 25 microns.

10. The method of claim 1, wherein the particle size is between about 5 to about 15 microns.

11. The method of claim 1, wherein the leach solution comprises a mixture of lime and limestone and the wt % of limestone in the mixture is between about 40 to about 95%.

12. The method of claim 11, wherein the amount of lime and/or limestone added to the leach solution is between about 100 to about 1200 kg/tonne of solids in the solution.

13. The method of claim 12, wherein the amount is about 800 kg/tonne.

14. The method of claim 1, wherein the refractory material is a refractory sulfide material bearing gold, silver or platinum.

15. The method of claim 1, wherein the refractory material includes a carbonaceous fraction.

16. The method of claim 1, wherein the treated material is subjected to a thickening step prior to the separate cyanide leaching step to recover the precious metal.

* * * * *